(12) United States Patent
Matthews

(10) Patent No.: US 11,647,784 B1
(45) Date of Patent: May 16, 2023

(54) CANNABIS STORAGE ASSEMBLY

(71) Applicant: Gershom Matthews, Warrenville, IL (US)

(72) Inventor: Gershom Matthews, Warrenville, IL (US)

( * ) Notice: Subject to any disclaimer, the term of this patent is extended or adjusted under 35 U.S.C. 154(b) by 0 days.

(21) Appl. No.: 17/709,921

(22) Filed: Mar. 31, 2022

(51) Int. Cl.
| | |
|---|---|
| *A24F 15/20* | (2006.01) |
| *A24F 15/08* | (2006.01) |
| *A24C 5/44* | (2006.01) |
| *A24F 19/00* | (2006.01) |
| *A47J 42/24* | (2006.01) |

(52) U.S. Cl.
CPC .............. *A24F 15/08* (2013.01); *A24C 5/44* (2013.01); *A24F 15/20* (2013.01); *A24F 19/0092* (2013.01); *A47J 42/24* (2013.01)

(58) Field of Classification Search
CPC ...... A24F 19/0064; A24F 19/10; A24F 23/00; A24F 15/20; A24F 15/08; A24C 5/44; A24J 42/24; B65D 85/08; B65D 85/12; B65D 85/10
USPC ................................. 206/265; 131/238, 347
See application file for complete search history.

(56) References Cited

U.S. PATENT DOCUMENTS

| | | | |
|---|---|---|---|
| 5,673,709 A | 10/1997 | Brothers | |
| 6,170,490 B1 | 1/2001 | Barrow | |
| 6,814,081 B2 | 11/2004 | Hasler | |
| D689,347 S | 9/2013 | Hainbach | |
| 8,695,906 B2 | 4/2014 | Hainbach | |
| 10,618,053 B2 | 4/2020 | Nocine | |
| 2003/0121803 A1 | 7/2003 | Banks | |
| 2015/0298135 A1* | 10/2015 | Spielman | A47J 42/50 241/101.01 |
| 2016/0262448 A1* | 9/2016 | Zeitlin | A24F 9/02 |
| 2018/0344086 A1* | 12/2018 | McDonough Migale | A47J 42/24 |
| 2021/0100277 A1* | 4/2021 | Spielman | A47J 42/14 |

FOREIGN PATENT DOCUMENTS

WO    WO2013062974    5/2013

* cited by examiner

*Primary Examiner* — King M Chu

(57) ABSTRACT

A *cannabis* storage assembly includes a *cannabis* grinder and a canister that is releasably engaged to the *cannabis* grinder such that the canister is vertically oriented on the *cannabis* grinder. The canister has a tunnel to insertably receive a rolled cigarette for storage. Furthermore, each of the *cannabis* grinder and the canister has a diameter sufficient for positioning in a cup holder in a vehicle. The canister including a plurality of storage containers each removably integrated into the canister to contain accessories for rolling cigarettes. An ashtray is positionable on the canister and a lid is positionable on the ashtray for closing the ashtray. A rolling tray, comprised of a deformable material, is provided such that the rolling tray can be rolled into a tube for storing in a respective one of the storage containers.

7 Claims, 6 Drawing Sheets

CANNABIS STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage devices and more particularly pertains to a new storage device for storing ground cannabis, a rolled cigarette and accessories for rolling cigarettes. The device includes a canister with a tunnel integrated into the canister for storing a rolled cigarette. The device includes a cannabis grinder that is attachable to the canister. Additionally, each of the cannabis grinder and the canister has a diameter sufficient to fit into a cup holder of a vehicle.

(2) Description of Related Art Including Information Disclosed Under 37 CFR 1.97 and 1.98

The prior art relates to storage devices including a variety of cylindrical ashtrays that have a tubular receptacle for storing a cigarette. The prior art discloses a variety of herb grinders that includes a pair of rotatable elements and grinding teeth for grinding herbs. The prior art discloses a tobacco box for rolling and holding cigarettes. In no instance does the prior art disclose a canister with a tunnel for storing cigarettes and a cannabis grinder removably engaged to the canister.

BRIEF SUMMARY OF THE INVENTION

An embodiment of the disclosure meets the needs presented above by generally comprising a cannabis grinder and a canister that is releasably engaged to the cannabis grinder such that the canister is vertically oriented on the cannabis grinder. The canister has a tunnel to insertably receive a rolled cigarette for storage. Furthermore, each of the cannabis grinder and the canister has a diameter sufficient for positioning in a cup holder in a vehicle. The canister including a plurality of storage containers each removably integrated into the canister to contain accessories for rolling cigarettes. An ashtray is positionable on the canister and a lid is positionable on the ashtray for closing the ashtray. A rolling tray, comprised of a deformable material, is provided such that the rolling tray can be rolled into a tube for storing in a respective one of the storage containers.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
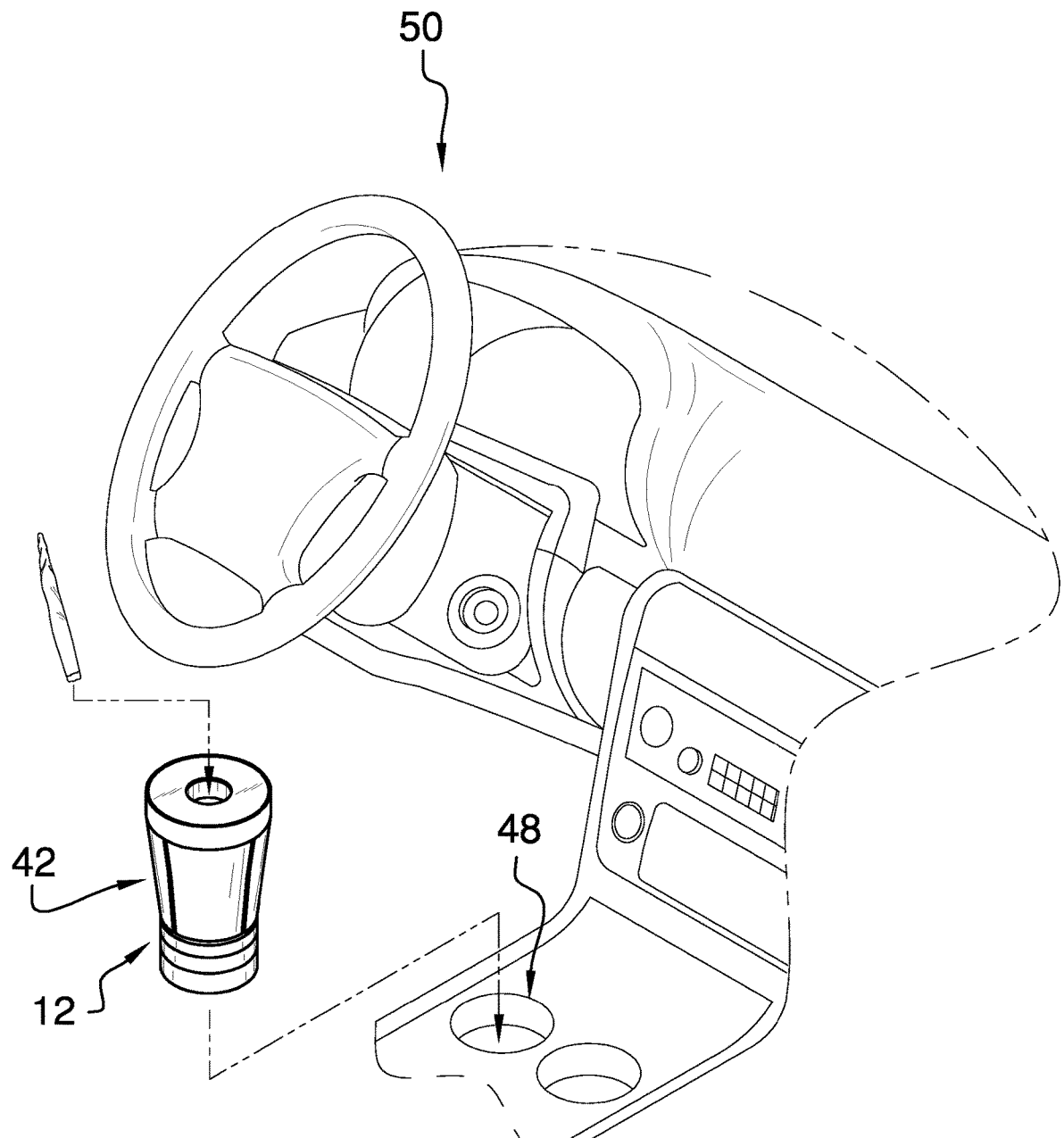
FIG. 1 is a perspective in-use view of a cannabis storage assembly according to an embodiment of the disclosure.
Figure 2:
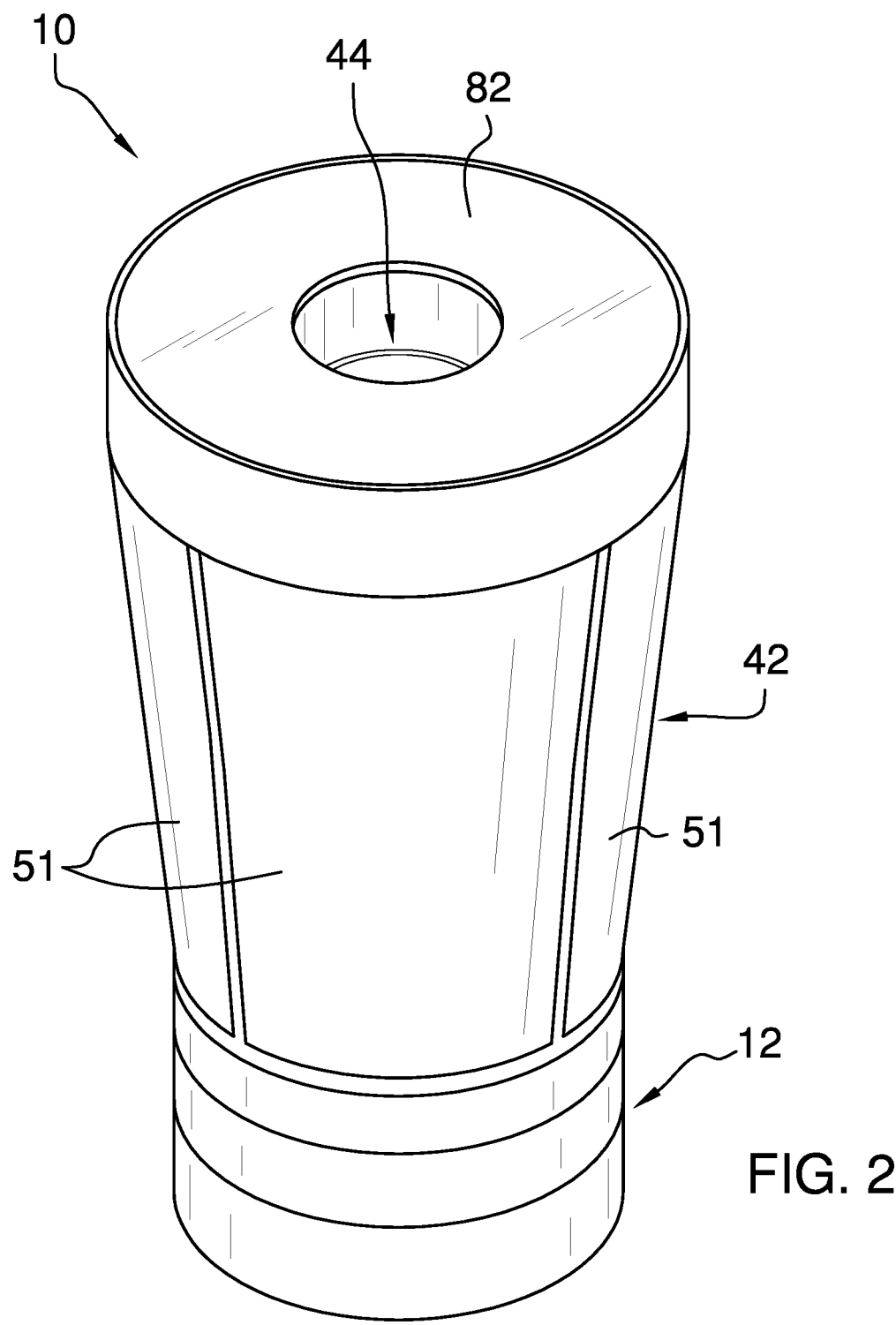
FIG. 2 is a top perspective view of an embodiment of the disclosure.
Figure 3:
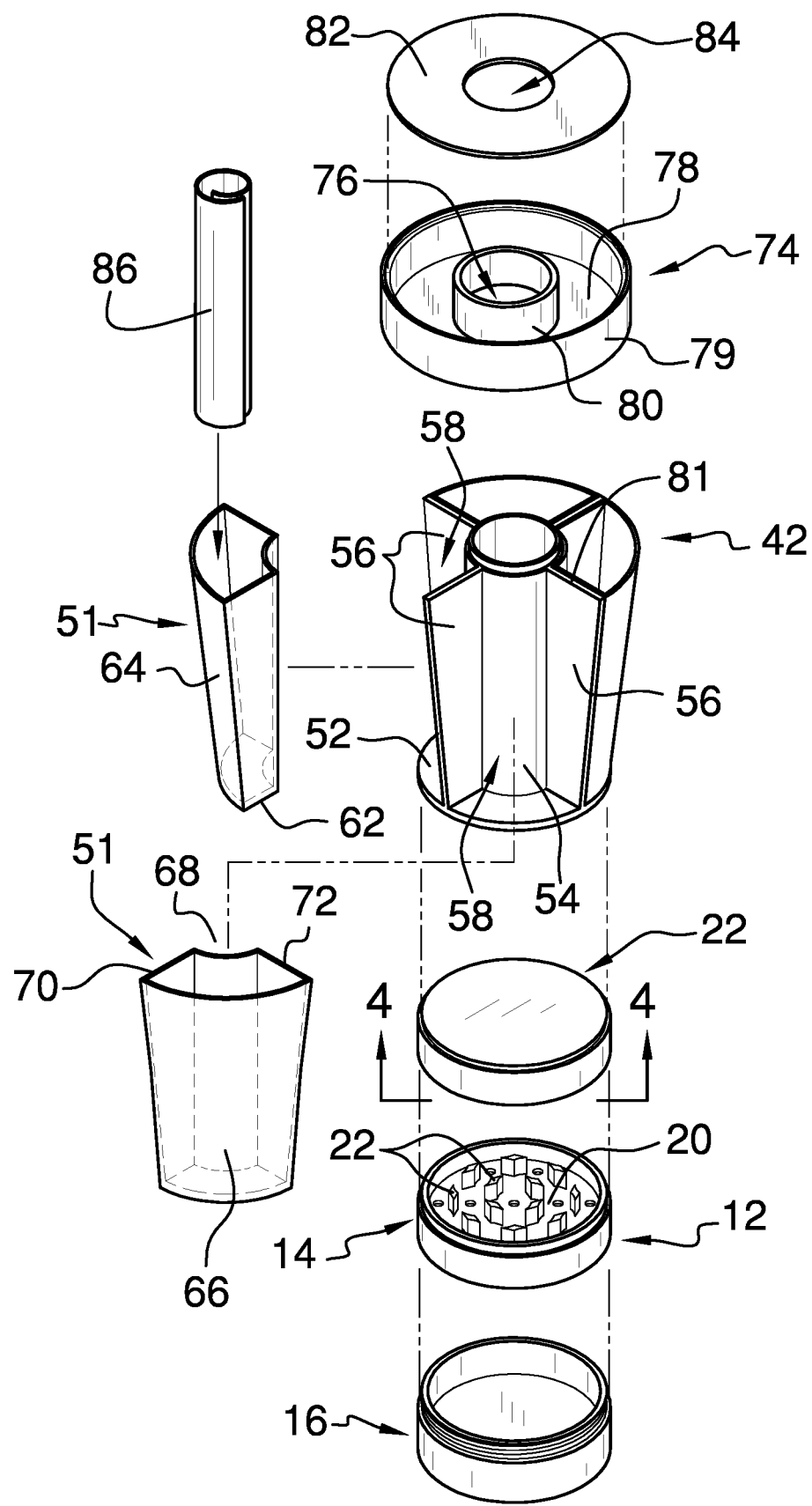
FIG. 3 is an exploded perspective view of an embodiment of the disclosure.
Figure 4:
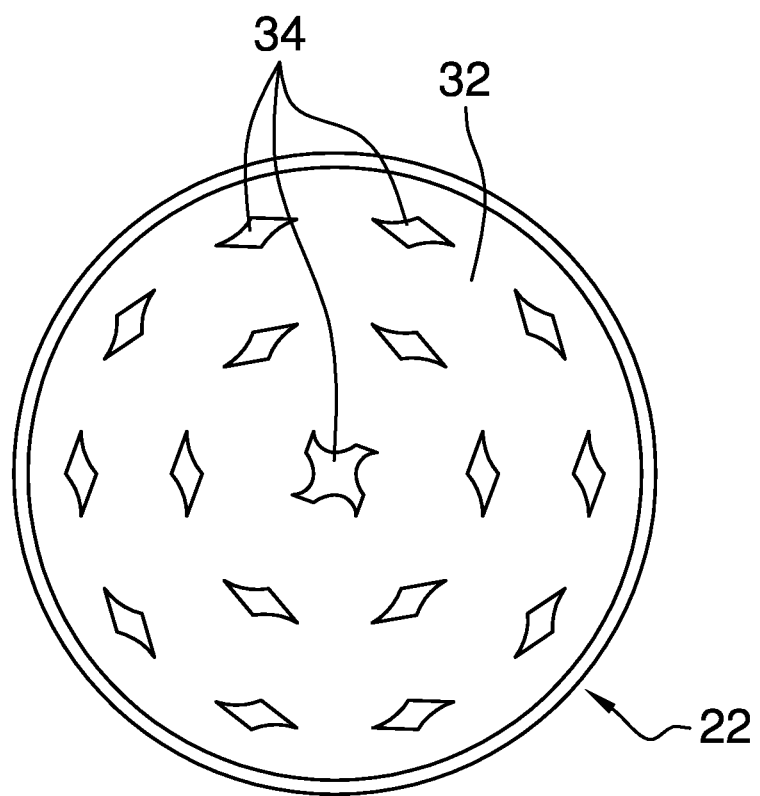
FIG. 4 is a bottom view of lid portion of a cannabis grinder of an embodiment of the disclosure.
Figure 5:
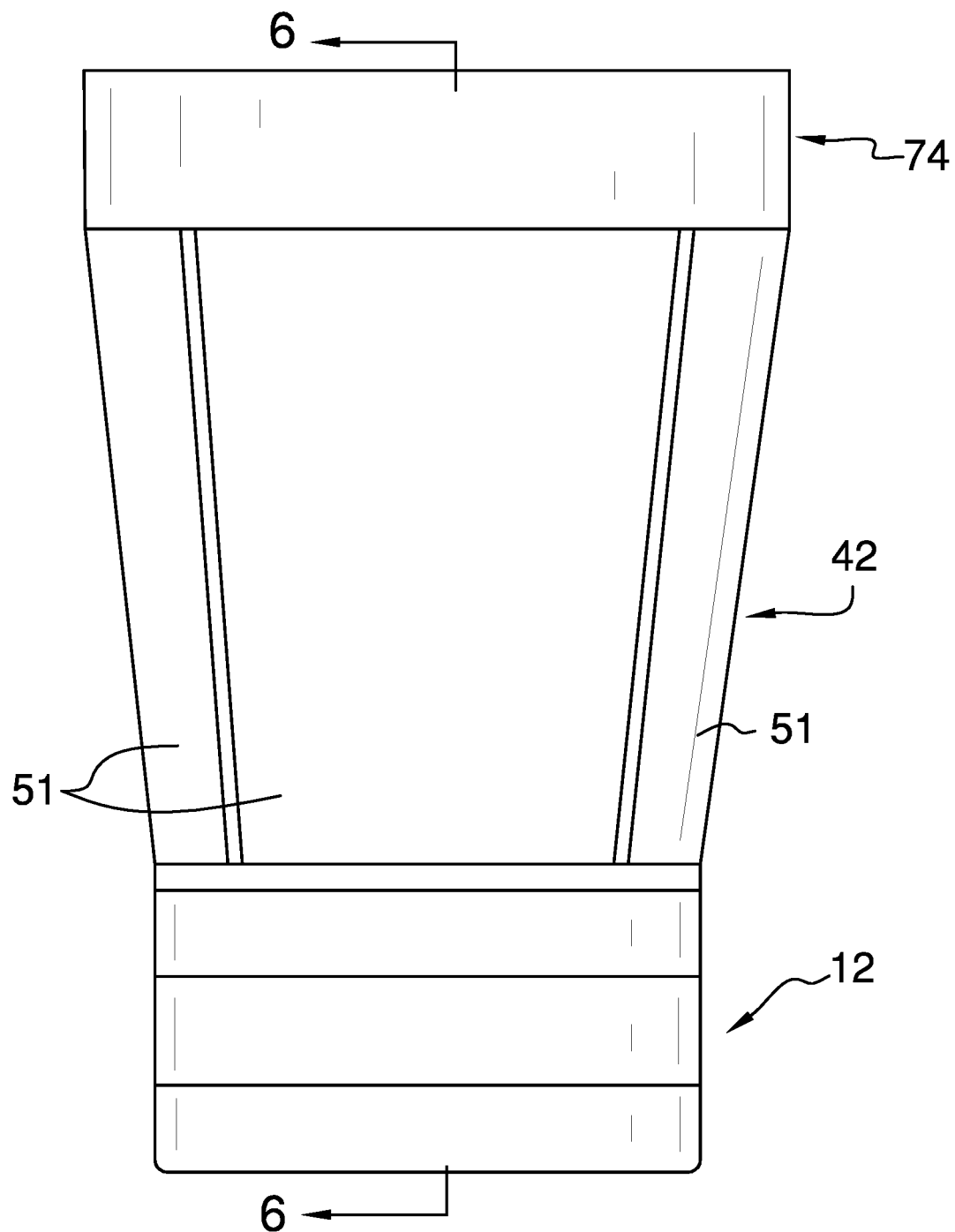
FIG. 5 is a front view of an embodiment of the disclosure.
Figure 6:
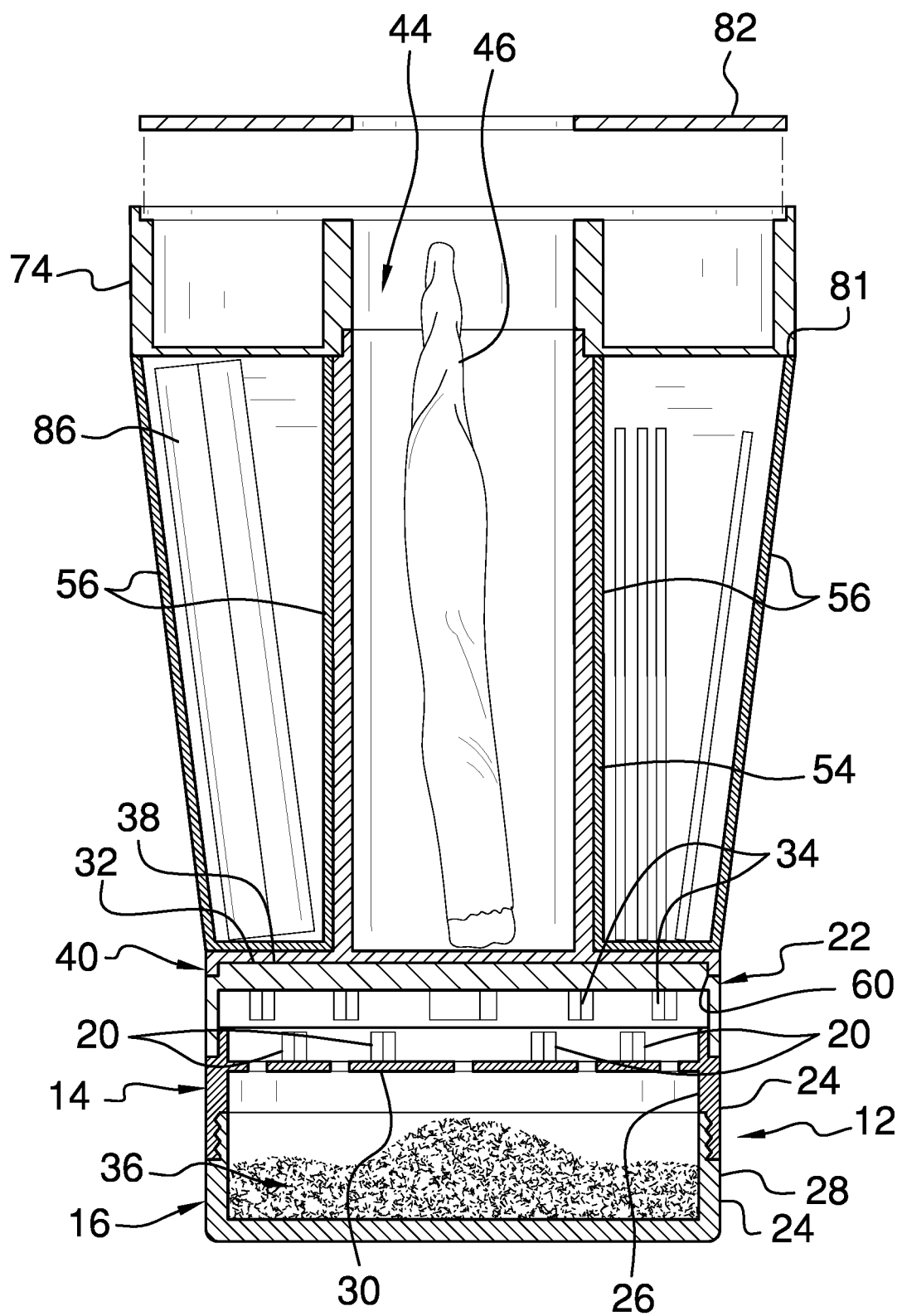
FIG. 6 is a cross sectional view taken along line 6-6 of FIG. 5 of an embodiment of the disclosure.

With reference now to the drawings, and in particular to FIGS. 1 through 6 thereof, a new storage device embodying the principles and concepts of an embodiment of the disclosure and generally designated by the reference numeral 10 will be described.

As best illustrated in FIGS. 1 through 6, the cannabis storage assembly 10 generally comprises a cannabis grinder 12 that has a grinder portion 14 which releasably engages a reservoir portion 16, and the grinder portion 14 has a foraminous wall 18 and a plurality of teeth 20. The cannabis grinder 12 includes a lid portion 22 that is rotatably positionable on the grinder portion 14. Each of the grinder portion 14 and the reservoir portion 16 has an outer wall 24. The outer wall 24 of the grinder portion 14 has threads on an inside surface 26 of the outer wall 24 of the grinder portion 14. Additionally, the outer wall 24 of the reservoir portion 16 has threads on an outer surface 28 of the outer wall 24 of the reservoir portion 16. The threads on the inside surface 26 threadably engage the threads on the outer surface 28 for attaching the grinder portion 14 to the reservoir portion 16.

The grinder portion 14 has a bottom wall 30, the bottom wall 30 is foraminous, and each of the teeth 20 on the grinder portion 14 extends upwardly from the bottom wall 30. The lid portion 22 has an upper wall 32 and the upper wall 32 has a plurality of teeth 34 extending downwardly from the upper wall 32. Furthermore, the plurality of teeth 34 on the upper wall 32 is interlaced with the plurality of teeth 20 on the bottom wall 30 to grind *cannabis* 36 for smoking having the ground *cannabis* 36 falling through the bottom wall 30 into the reservoir portion 16. The upper wall 32 of the lid portion 22 has a top surface 38, the top surface 38 has a recess 40 extending into the top surface 38 and the recess 40 is coextensive with a perimeter of the upper wall 32.

A canister 42 is releasably engaged to the *cannabis* grinder 12 such that the canister 42 is vertically oriented on the *cannabis* grinder 12. The canister 42 has a tunnel 44 is integrated into the canister 42 to insertably receive a rolled cigarette 46 for storage. Each of the *cannabis* grinder 12 and the canister 42 has a diameter that is sufficient for positioning in a cup holder 48 in a vehicle 50. In this way the canister 42 is accessible to an occupant of the vehicle 50. The canister 42 includes a plurality of storage containers 51 that are removably integrated into the canister 42 to contain accessories for rolling cigarettes. The vehicle 50 may be a passenger vehicle, a cargo vehicle or any other motorized vehicle that is driven on public roadways.

The canister 42 comprises a disk 52, a tube 54 extending upwardly from the disk 52 and a plurality of dividers 56 radiating outwardly from the tube 54. The plurality of dividers 56 defines a plurality of spaces 58 between each of the dividers 56 and the tube 54 defines the tunnel 44 for receiving the rolled cigarette 46. The disk 52 has a lip 60 extending downwardly from a perimeter edge of the disk 52. The disk 52 rests on the top surface 38 of the upper wall 32 of the lid portion 22 of the *cannabis* grinder 12 and the lip 60 engages the recess 40 in the top surface 38.

Each of the storage containers 51 has a bottom wall 62 and an outer wall 64 extending upwardly from the bottom wall 62 of the storage containers 51. The outer wall 64 of the storage containers 51 has front side 66, a back side 68, a first lateral side 70 and a second lateral side 72. The front side 66 is concavely arcuate with respect to the first lateral side 70 and the second lateral side 72 such that the front side 66 conforms to the tube 54 when the storage containers 51 are positioned in the spaces 58 between the dividers 56. The back side 68 is co-arcuate with the front side 66. Each of the first lateral side 70 and the second lateral side 72 angles inwardly between the back side 68 and the front side 66 such that each of the first lateral side 70 and the second lateral side 72 abuts a respective divider 56 when the storage containers 51 are positioned in the spaces 58.

An ashtray 74 is provided and the ashtray 74 is positionable on the canister 42 such that the ashtray 74 is accessible to the occupant of the vehicle 50. The ashtray 74 has an opening 76 extending through the ashtray 74 to accommodate the tunnel 44 in the canister 42 when the ashtray 74 is positioned on the canister 42. In this way the cigarette 46 in the tunnel 44 is accessible when the ashtray 74 is positioned on the canister 42. The ashtray 74 has a lower wall 78 and a perimeter wall 79 extending upwardly from the lower wall 78. The opening 76 extends through the lower wall 78 and the opening 76 is centrally positioned on the lower wall 78. The ashtray 74 has a ring 80 which extends upwardly from the lower wall 78 and surrounds the opening 76. The lower wall 78 rests on an upper edge 81 of each of the dividers 56 when the ashtray 74 is positioned on the canister 42. Furthermore, the tube 54 is aligned with the opening 76 when the ashtray 74 is positioned on the canister 42.

A lid 82 is provided and the lid 82 is positionable on the ashtray 74 for closing the ashtray 74. The lid 82 has a hole 84 extending through the lid 82 and the hole 84 is aligned with the tunnel 44 in the canister 42 when the ashtray 74 is positioned on the canister 42. In this way the hole 84 facilitates the rolled cigarette 46 to be accessible in the tunnel 44 when the lid 82 is positioned on the ashtray 74. A rolling tray 86 is provided and the rolling tray 86 is comprised of a deformable material, including but not being limited to, silicone or rubber. In this way the rolling tray 86 can be rolled into a tube 54 for storing 70 in a respective one of the storage containers 51.

In use, the *cannabis* grinder 12 is employed for grinding and subsequently storing 70 the ground *cannabis* 36. Accessories for rolling cigarettes, such as rolling papers, for example, can be stored in any other storage containers 51. Additionally, any rolled cigarettes 46 can be inserted into the tunnel 44 for storage. In this way the rolled cigarettes 46 are easily accessible to occupants of the vehicle 50 along with the accessories for rolling cigarettes. Furthermore, the lid 82 can be removed from the ashtray 74 to facilitate the ashtray 74 to collect any ashes from smoking the rolled cigarette 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A *cannabis* storage assembly for storing *cannabis* and accessories for smoking *cannabis* in a vehicle, said assembly comprising:

a *cannabis* grinder having a grinder portion releasably engaging a reservoir portion, said grinder portion having a foraminous wall and a plurality of teeth, said *cannabis* grinder including a lid portion being rotatably positionable on said grinder portion;

a canister being releasably engaged to said *cannabis* grinder such that said canister is vertically oriented on said *cannabis* grinder, said canister having a tunnel being integrated into said canister wherein said tunnel is configured to insertably receive a rolled cigarette for storage, each of said *cannabis* grinder and said canister having a diameter being sufficient for positioning in a cup holder in a vehicle wherein said canister is configured to be accessible to an occupant of the vehicle, said canister including a plurality of storage containers being removably integrated into said canister wherein each of said storage containers is configured to contain accessories for rolling cigarettes;

an ashtray being positionable on said canister wherein said ashtray is configured to be accessible to the occupant of the vehicle, said ashtray having an opening extending through said ashtray, said opening accommodating said tunnel in said canister when said ashtray is positioned on said canister;

a lid being positionable on said ashtray for closing said ashtray, said lid having a hole extending through said lid, said hole being aligned with said tunnel in said canister when said ashtray is positioned on said canister wherein said hole is configured to facilitate the rolled cigarette to be accessible in said tunnel; and a rolling tray being comprised of a deformable material such that said rolling tray can be rolled into a tube for storing in a respective one of said storage containers.

2. The assembly according to claim 1, wherein:

each of said grinder portion and said reservoir portion has an outer wall, said outer wall of said grinder portion having threads on a inside surface of said outer wall of said grinder portion, said outer wall of said reservoir portion having threads on a outer surface of said outer wall of said reservoir portion, said threads on said inside surface threadably engaging said threads on said outer surface for attaching said grinder portion to said reservoir portion;

said grinder portion has a bottom wall, said bottom wall being foraminous, each of said teeth on said grinder portion extending upwardly from said bottom wall;

said lid portion has an upper wall, said upper wall having a plurality of teeth extending downwardly from said upper wall, said plurality of teeth on said upper wall being interlaced with said plurality of teeth on said bottom wall wherein said teeth on said upper wall and said teeth on said bottom wall are configured to grind *cannabis* for smoking having the ground *cannabis* falling through said bottom wall into said reservoir portion; and said upper wall of said lid portion has a top surface, said top surface having a recess extending into said top surface, said recess being coextensive with a perimeter of said upper wall.

3. The assembly according to claim 2, wherein said canister comprises a disk, a tube extending upwardly from said disk and a plurality of dividers radiating outwardly from said tube to define a plurality of spaces between each of said dividers, said tube defining said tunnel for receiving the rolled cigarette, said disk having a lip extending downwardly from a perimeter edge of said disk, said disk resting on said top surface of said upper wall of said lid portion of said *cannabis* grinder having said lip engaging said recess in said top surface.

4. The assembly according to claim 3, wherein each of said storage containers has a bottom wall and an outer wall extending upwardly from said bottom wall, said outer wall having front side, a back side, a first lateral side and a second lateral side, said front side being concavely arcuate with respect to said first lateral side and said second lateral side such that said front side conforms to said tube when said storage containers are positioned in said spaces between said dividers.

5. The assembly according to claim 4, wherein:

said back side is co-arcuate with said front side; and each of said first lateral side and said second lateral side angles inwardly between said back side and said front side such that each of said first lateral side and said second lateral side abuts a respective divider when said storage containers are positioned in said spaces.

6. The assembly according to claim 3, wherein:

said ashtray has a lower wall and a perimeter wall extending upwardly from said lower wall, said opening extending through said lower wall, said opening being centrally positioned on said lower wall;

said ashtray has a ring extending upwardly from said lower wall and surrounding said opening; and said lower wall rests on an upper edge of each of said dividers when said ashtray is positioned on said canister having said tube being aligned with said opening.

7. A *cannabis* storage assembly for storing *cannabis* and accessories for smoking *cannabis* in a vehicle, said assembly comprising:

a *cannabis* grinder having a grinder portion releasably engaging a reservoir portion, said grinder portion having a foraminous wall and a plurality of teeth, said *cannabis* grinder including a lid portion being rotatably positionable on said grinder portion, each of said grinder portion and said reservoir portion having an outer wall, said outer wall of said grinder portion having threads on a inside surface of said outer wall of said grinder portion, said outer wall of said reservoir portion having threads on a outer surface of said outer wall of said reservoir portion, said threads on said inside surface threadably engaging said threads on said outer surface for attaching said grinder portion to said reservoir portion, said grinder portion having a bottom wall, said bottom wall being foraminous, each of said teeth on said grinder portion extending upwardly from said bottom wall, said lid portion having an upper wall, said upper wall having a plurality of teeth extending downwardly from said upper wall, said plurality of teeth on said upper wall being interlaced with said plurality of teeth on said bottom wall wherein said teeth on said upper wall and said teeth on said bottom wall are configured to grind *cannabis* for smoking having the ground *cannabis* falling through said bottom wall into said reservoir portion, said upper wall of said lid portion having a top surface, said top surface having a recess extending into said top surface, said recess being coextensive with a perimeter of said upper wall;

a canister being releasably engaged to said *cannabis* grinder such that said canister is vertically oriented on said *cannabis* grinder, said canister having a tunnel being integrated into said canister wherein said tunnel is configured to insertably receive a rolled cigarette for storage, each of said *cannabis* grinder and said canister having a diameter being sufficient for positioning in a cup holder in a vehicle wherein said canister is configured to be accessible to an occupant of the vehicle, said canister including a plurality of storage containers being removably integrated into said canister wherein each of said storage containers is configured to contain accessories for rolling cigarettes, said canister comprising a disk, a tube extending upwardly from said disk and a plurality of dividers radiating outwardly from said tube to define a plurality of spaces between each of said dividers, said tube defining said tunnel for receiving the rolled cigarette, said disk having a lip extending downwardly from a perimeter edge of said disk, said disk resting on said top surface of said upper wall of said lid portion of said *cannabis* grinder having said lip engaging said recess in said top surface, each of said storage containers having a bottom wall and an outer wall extending upwardly from said bottom wall, said outer wall having front side, a back side, a first lateral side and a second lateral side, said front side being concavely arcuate with respect to said first lateral side and said second lateral side such that said front side conforms to said tube when said storage containers are positioned in said spaces between said dividers, said back side being co-arcuate with said front side, each of said first lateral side and said second lateral side angling inwardly between said back side and said front side such that each of said first lateral side and said second lateral side abuts a respective divider when said storage containers are positioned in said spaces;
an ashtray being positionable on said canister wherein said ashtray is configured to be accessible to the occupant of the vehicle, said ashtray having an opening extending through said ashtray, said opening accommodating said tunnel in said canister when said ashtray is positioned on said canister, said ashtray having a lower wall and a perimeter wall extending upwardly from said lower wall, said opening extending through said lower wall, said opening being centrally positioned on said lower wall, said ashtray having a ring extending upwardly from said lower wall and surrounding said opening, said lower wall resting on an upper edge of each of said dividers when said ashtray is positioned on said canister having said tube being aligned with said opening;
a lid being positionable on said ashtray for closing said ashtray, said lid having a hole extending through said lid, said hole being aligned with said tunnel in said canister when said ashtray is positioned on said canister wherein said hole is configured to facilitate the rolled cigarette to be accessible in said tunnel; and
a rolling tray being comprised of a deformable material such that said rolling tray can be rolled into a tube for storing in a respective one of said storage containers.

\* \* \* \* \*